United States Patent [19]

Vazin

[11] Patent Number: 4,743,041

[45] Date of Patent: May 10, 1988

[54] BICYCLE WITH AUTOMATICALLY VARIABLE GEAR RATIO DRIVE

[76] Inventor: Hassan Vazin, P.O. Box 230252, Montgomery, Ala. 36123

[21] Appl. No.: 909,197

[22] Filed: Sep. 19, 1986

Related U.S. Application Data

[63] Continuation-in-part of Ser. No. 628,435, Jul. 6, 1984, abandoned.

[51] Int. Cl.$^4$ .............................................. B62M 9/06
[52] U.S. Cl. ....................................... 280/236; 474/8; 474/11; 474/70
[58] Field of Search ............... 280/236, 238, 230, 212, 280/217, 218, 261; 180/70.1; 474/11, 12, 13, 14, 70, 72, 8; 301/2.5

[56] References Cited

U.S. PATENT DOCUMENTS

| | | | |
|---|---|---|---|
| 2,336,167 | 12/1943 | Dillon | 180/70.1 X |
| 3,396,591 | 8/1968 | Schorp | 474/8 |
| 3,688,595 | 9/1972 | Bauer | 474/8 |
| 3,830,521 | 8/1974 | Gardel et al. | 280/236 |
| 4,036,068 | 7/1977 | Gilbert | 474/14 |
| 4,119,326 | 10/1978 | Porter | 280/236 |

FOREIGN PATENT DOCUMENTS

| | | | |
|---|---|---|---|
| 466022 | 10/1951 | Italy | 474/70 |
| 135873 | 3/1920 | United Kingdom | 474/13 |
| 186273 | 9/1922 | United Kingdom | 474/13 |

*Primary Examiner*—John J. Love
*Assistant Examiner*—Mitchell J. Hill
*Attorney, Agent, or Firm*—Dressler, Goldsmith, Shore, Sutker & Milnamow, Ltd.

[57] ABSTRACT

A bicycle is provided with an automatically variable gear ratio drive by employing a frame having a bifurcated truss rotatably supporting an axle for the rear wheel, this axle being fixed to the rear wheel for rotation therewith. A pedal assembly is positioned intermediate the wheels with a one-way clutch on the pedal assembly and a pulley is mounted on the rear wheel axle, this pulley being constituted by two laterally separated segments which are laterally moveable on the axle. A belt or chain interconnects the pedal assembly with the pulley, and an idler maintains tension on the belt or chain. The inner sides of the pulley segments are sloped and the outer side portions of the belt or chain are shaped to mate with these sloping sides so that tension on the belt or chain will cause it to move inwardly on the pulley to increase the gear ratio. Centrifugal means are provided to rotate with the axle to increase the spacing between the pulley segments with increasing bicycle speed, and this increases the gear ratio. Spring means are associated with the axle to bias the pulley segments together and thus decrease the gear ratio as the bicycle speed decreases. Means are also provided for adjusting the tension on the spring means so that the rider can vary the relationship between gear ratio and velocity to suit himself, and a second spring means which is cable adjusted is provided so that the rider can alter the gear ratio when he wishes. Lastly, means are provided for delaying the centrifugal action to facilitate starting the bicycle.

8 Claims, 2 Drawing Sheets

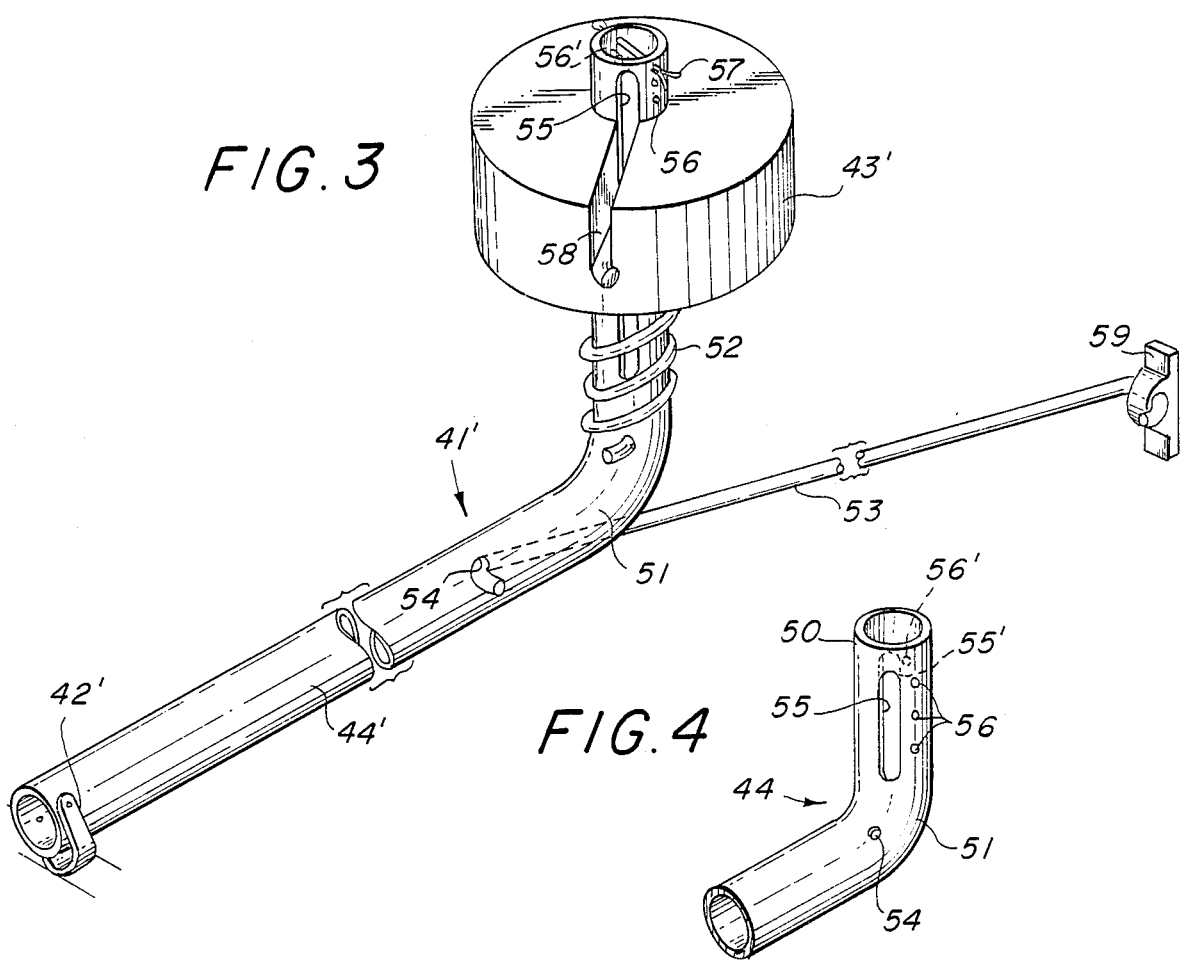
FIG. 3
FIG. 4
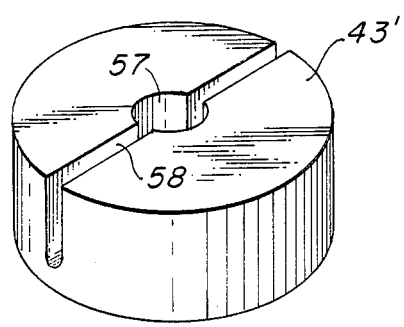
FIG. 5
FIG. 6

BICYCLE WITH AUTOMATICALLY VARIABLE GEAR RATIO DRIVE

DESCRIPTION

This application is a continuation-in-part of application Ser. No. 628,435 filed July 6, 1984, now abandoned.

1. Technical Field

This invention relates to bicycles which include an automatically variable gear ratio drive to simplify the operation of the bicycle while retaining the advantage of always employing a gear ratio which is appropriate to the speed and capacity of the rider.

2. Background Art

Bicycles provide a practical form of self-propelled transportation, but a single gear ratio must be a compromise between the low ratio needed for easy starting and slow speed operation and the high ratio needed for high speed operation. Accordingly, many bicycles include several gear ratios, and one can shift back and forth between these gears in order to most efficiently operate the bicycle under various conditions. Bicycles with 10 or more gears are well known. It is difficult to select and shift back and forth among a large number of gear ratios, so in instances the rider will use only a few of the gear ratios which are available.

Of course, it is helpful to have as many gear ratios as possible, but then the structure becomes heavy, expensive and difficult to maintain and operate. As a result, it is desired to have a bicycle with an indefinately variable gear ratio, and it is particularly desirable to have such a variable gear ratio operate automatically, so the rider need not concern himself at all with gear ratio selection as he goes about the task of operating his bicycle.

Even after one has provided an infinitely variable gear ratio which is automatic, one will still wish to easily adjust the device so that the gear ratio will be either greater or smaller at any particular speed. This might be utilized when a different individual is to ride the bicycle or when a given rider attempts to maximize the riding characteristics for himself. Moreover, it is also important to adjust the gear ratio regulator to provide a decreased gear ratio in some situation which require it, as one is riding the bicyle, and this is a further feature of this invention.

A further feature of this invention is to maintain a low gear ratio (a high torque) as the bicycle is started when its speed is minimal and the balance more difficult. To this end, this invention provides a time delay between the time the rider starts the bicycle in motion and the time the centrifugal actuator is engaged to begiin to increase the gear ratio.

Of course, one must also provide a structure for accomplishing the foregoing which is simple to construct and which is of minimum weight, and all of these various objectives are contemplated by this invention.

DISCLOSURE OF INVENTION

In accordance with this invention, a bicycle is provided with a frame which supports front and rear wheels, this frame including a bifurcated truss for rotatably supporting an axle for the rear wheel, this axle being fixed to the rear wheel for rotation therewith. A pedal assembly is positioned intermediate the wheels with a one-way clutch on the pedal assembly as is customary to allow the rider to stop pedaling while the bike is moving. A pulley is mounted on the rear wheel axle with this pulley being constituted by two laterally separated segments which are laterally moveable on the axle. A belt or chain is now used to interconnect the pedal assembly with the pulley, and an idler is used to maintain tension on the belt or chain. The inner sides of the pulley segments are sloped and the outer side portions of the belt or chain are shaped to mate with these sloping sides so that tension on the belt or chain will cause it to move inwardly on the pulley to increase the gear ratio. Centrifugal means are provided to rotate with the axle to increase the spacing between the pulley segments with increasing bicycle speed, and this increases the gear ratio. Spring means are associated with the axle to bias the pulley segments together and thus decrease the gear ratio as the bicycle speed decreases. As will be evident, the gear ratio will now vary automatically with the speed of the bicycle as the centrifugal force either overcomes the spring pressure with increasing speed, or the spring pressure overcomes the centrifugal force with decreasing speed. In preferred practice, means are also provided for adjusting the tension on the spring means so that the rider can vary the relationship between gear ratio and velocity to suit himself when the bicycle is still. Since there are two pulley segments there can be two springs, one for each segment, and one can be screw adjusted while the bicycle is still and the other can be cable adjusted so that the rider can change the gear ratio when he wishes to do this, as by abruptly reducing it to ease the burden of pedaling.

In preferred practice, the axle is hollow and is formed to define opposed slots in the vicinity of the pulley segments, and a bar is connected to at least one of said pulley segments with this bar extending through the slots. It is now possible to mount the spring means within the axle where it engages the bar to bias the pulley segments together and thereby decrease the gear ratio. This construction is simpler and it places the springs where they are protected from dirt.

It is particularly desired to employ spring means biasing movably mounted centrifugal weights inwardly toward the axle so that at the low speeds encountered while starting the bicycle, the centrifugal weights are prevented from moving the centrifugal arms outwardly until after the spring pressure has been overcome. In this way, the capacity of the centrifugal structure to change the gear ratio is delayed as the bicycle is started so that it remains in a low gear ratio until the bicycle is moving with enough velocity to ease the burden of balancing the same.

This invention will be more fully understood from the accompanying drawings in which:

FIG. 3 is a partial perspective view showing a modified form of the invention in which the centrifugal means includes a movable weight on the outer end of the supporting arm, the weight being biased inwardly to delay the centrifugal action;

FIG. 4 is a partial perspective view of the outer portion of the weight-supporting arm;

FIG. 5 is a perspective view of the weight; and

FIG. 6 is a perspective view of a pair of pulley segments with its associated chain to illustrate the substitution of a chain drive for the belt drive of FIG. 1.

Figure 1:
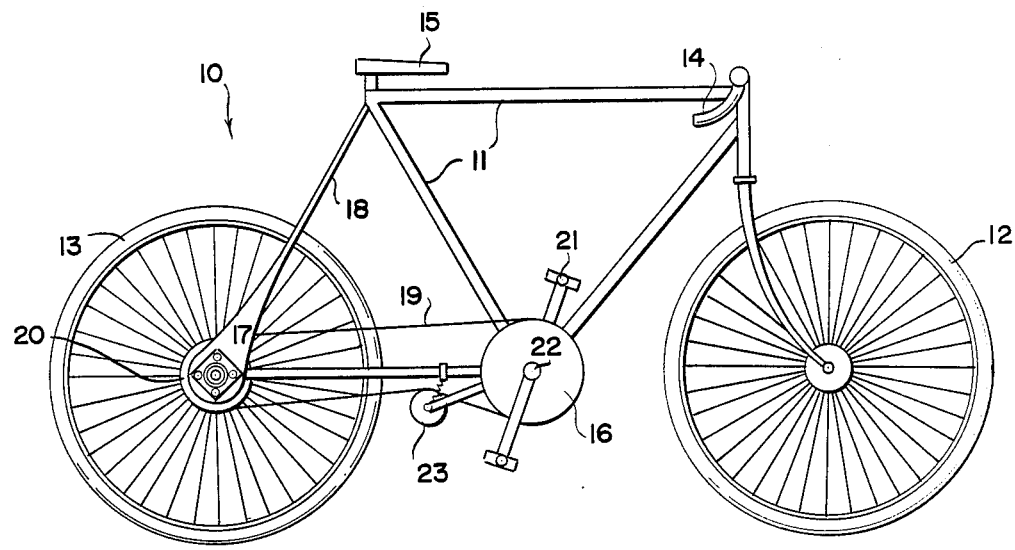
FIG. 1 is a side elevation of an illustrative bicycle constructed in accordance with the invention.

Referring more particularly to FIG. 1, numeral 10 generally identifies a bicycle constituted by a frame 11, front and rear wheels 12 and 13, and including the conventional handle bar 14, seat 15, and pedal assembly 16. The rear wheel 13 is carried by an axle 17 which rotates at the lower end of a bifurcated truss 18. An elongated driving element 19, which may be either a belt or chain, extends between the pedal assembly 16 and a pulley 20 which is mounted on the axle 17.

The pedal assembly 16 is entirely conventional in that it includes pedals 21 which are connected to a central shaft 22, and a one-way clutch is included (but not shown since it is conventional and concealed within pedal assembly 16) so that operation of the pedals is effective to drive the belt or chain 19 and, while the bicycle is rolling, the pedals may be still so that the bicycle coasts. While one-way clutches are entirely conventional, they are usually mounted on the rear axle, but here the one-way clutch is part of the pedal assembly 16. The details of the one-way clutch are conventional and are not presented herein. The belt or chain 19 is tensioned by an idler 23 to maintain tension thereon.

Figure 2:
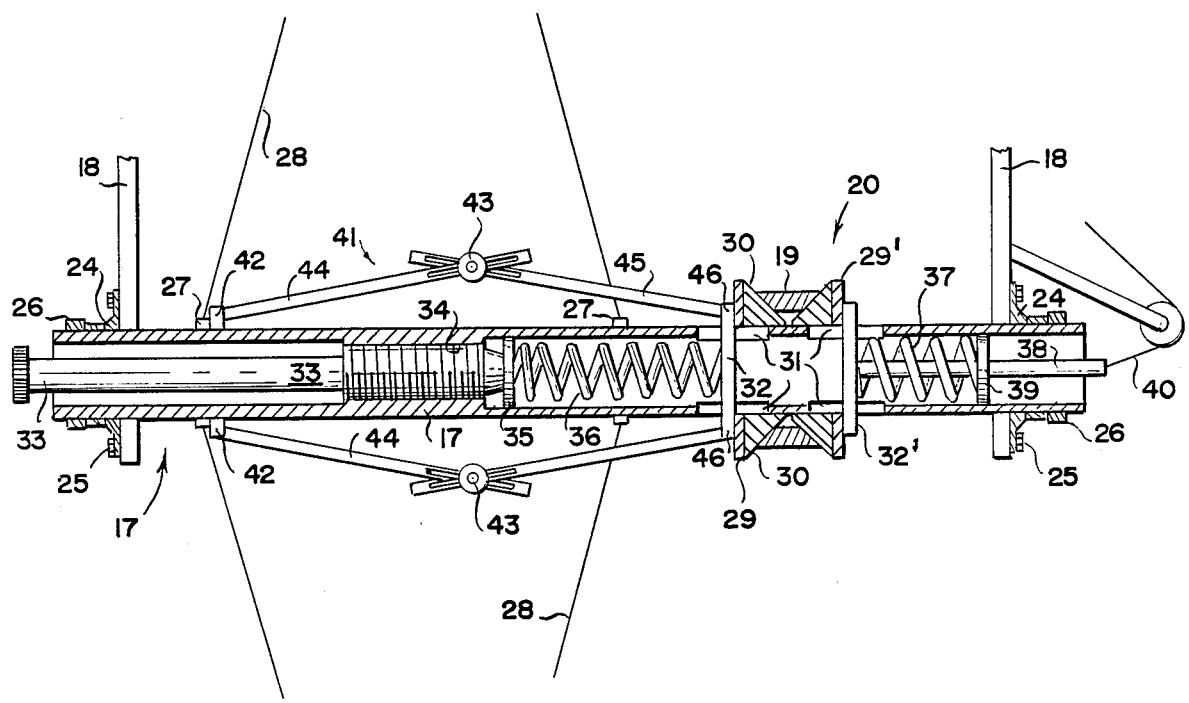
FIG. 2 is a cross-section taken through the rear axle of the bicycle.

The details of the wheel mounting and automatically variable gear ratio is shown in FIG. 2 where these features center around the rear axle structure. As is shown in FIG. 2, the axle 17 is rotatably supported at the lower bifurcated end of the truss 18 by means of bearings 24 which are bolted to the truss 18 by bolts 25 and positioned by bearing collars 26 which are secured to the axle 17 (a threaded connection being usual, but not shown). There are many types of bearings, some of which do not include a collar, so collar 26 can be omitted.

Between the lower ends of the truss 18, the axle 17 includes one side which is connected to the rear wheel via supports 27 which are fixed to the axle, and spokes 28 which are connected to the wheel in conventional fashion, and another side which carries the pulley 20. As can be seen, pulley 20 is constituted by two laterally separated segments 29 and 29' the interior sides of which slope downwardly and inwardly as indicated at 30. These segments 29 and 29' are laterally moveable on the axle 17 and are fixed to the axle to rotate therewith either by bars 32 or by being keyed to the axle by keys (not shown) which extend longitudinally of the axle, or both.

As will be seen, the driving element 19, which is shown as a belt in the drawing, has sloping sides which mate with the sloping interior sides 30, so the tensioned belt moves inwardly of pulley 20 as far as it can go as determined by the spacing of segments 29 and 29'. When the segments move inwardly, the belt 19 is forced outwardly, and this effectively increases the diameter of the pulley, and hence it decreases the gear ratio.

When the belt is replaced by a chain, the interior sloping sides 30 must be configured to receive the chain, but this is itself known, and forms no part of this invention, albeit a suitable structure is pictured in FIG. 6 in which the pulley segments 70 and 71 are displaced, as pictured, and the width of the elements of the chain is automatically laterally adjustable. The operation of a variable speed chain 72 drive is well known, and these drives are commercially available from FMC Corporation.

The axle 17 is a hollow tube which is slotted, as indicated at 31, in the vicinity of the pulley segments 29 and 29' so that bars 32, on for each pulley segment 29 and 29', can extend through slots 31 to be connected by means not shown to the exteriors of pully segments 29 and 29'. The slots 31 for bar 32 are shown in line with slots 31 for bar 32', but the axle 17 is less weakened by having the slots for one bar 90° offset from those for the other bar. Since these bars 32 extend through the axle 17, they can be spring biased by means of a spring which is positioned within the hollow interior of the axle. If the spring biasing means were positioned at the outside of the axle, then the bars 32 and slots 31 would be unnecessary, and the pulley segments would now be keyed to the exterior of the axle. However, the cable adjustment feature to be described hereinafter would not be as easy to arrange as in the preferred structure shown, and the spring would now be exposed and more subject to becoming jammed by dirt.

At one side of the axle 17 is a tension adjusting screw 33 which is threaded to the interior of the axle at 34 and which terminates in a plate 35 which bears against the one end of a compression spring 36 which bears against one of the bars 32. As will be evident, by turning the screw 33, one can vary the position of plate 35 and thus vary the force exerted by spring 36. This adjustment is made by the rider when the bicycle is at rest based on his experience while riding. Bar 33 can be configured to receive the end of spring 36, thus eliminating plate 35.

In some circumstances, it is desirable to pull one of the pulley segments away from the other or push them closer together in order to provide an abrupt change in the gear ratio. This is done by having the second compression spring 37 connected at its inner end to a rod 38 which is positioned to extend along the axis of axle 17 by a plate 39 having a centrally positioned hole through which the rod 38 extends. The outer end of rod 38 is connected to a cable 40 which is guided to an appropriate position on the bicycle frame to be operated by the rider. The rod 38 can be replaced by a short extension on bar 32' and the cable 40 can extend through the hole in plate 39 and through spring 37 to be connected to the extension. In this variation, spring 37 will seat on that extension and also on an extension on the interior of plate 39.

Whenever cable 40 is operated, the associated bar 32 is allowed to move toward or away from the plate 39 and this allows the belt 19 to move to change the gear ratio. Since cable 40 can be operated by the rider while the bike is moving, he can vary the length of cable 40 which is available, and hence control the range of gear ratios which is available.

The centrifugal means 41 is fixed to mounts 42 carried by the exterior of axle 17 so as to be rotatable with the axle. Since the spokes 28 and the centrifugal means 41 both rotate with the axle 17, these do not interfere with one another. As can be seen, centrifugal means 41 is constituted by weights 43 which are pivotally connected to arms 44 and 45. The weights can be changed to adjust the centrifugal action, but this is not as convenient as turning screw 33. Arms 44 are provided to mounts 42, and arms 45 are pivoted to the bars 32 at 46. The arms 45 could be pivoted to the segment 29 directly.

As will be evident, as the axle turns more rapidly with increasing bicycle speed, the weights 43 are thrown outwardly, and the connected segment 29 is moved away from the other segment of the pulley. As a result, as the bicycle moves more rapidly, the spacing between the pulley segments 29 and 29' increases and this causes an increase in the gear ratio.

The delay action which enhances the rideability of the bicycle is illustrated in FIG. 3 where the modified centrifugal means 41' includes only a single arm 44' which is pivotally mounted on the axle via pivot mount 42', arm 44' approximately paralleling the axle when the bicycle is still. Arm 44' differs from the previously described arm 44 in that its free outer portion 50 is bent outwardly to extend from the axle, the bend being shown at 51. Weight 43' is movably mounted on the outer portion 50 where it is biased inwardly toward the axle by tension spring 52. Arm 44' is interconnected with pulley segment 29 (not shown) by connecting rod 53 which hooks into hole 54 in arm 44' and into connector 59 which is secured to pulley segment 29.

Turning to FIG. 4, the tubular arm 44' includes a lower spring hole 54 and a pair of juxtaposed elongated slots 55 and 55' (shown in dotted lines). Juxtaposed holes 56 and 56' (shown in dotted lines) are also present for a purpose to be described.

The weight 43' is pictured in FIG. 5 where it has an axial hold 57 and a groove 58 which extends entirely across the outer end of weight 43', bisecting hole 57. This groove 58 extends only partially through the weight.

As can be seen in FIG. 3, weight 43' is slid only the outer portion 50 of arm 44' on which tension spring 52 is present with the inner end thereof hooked into hole 54. The outer end of spring 52 is then forced through groove 58 and juxtaposed slots 55 and 55' and its outer extremity is hooked around weight 43', as shown. After weight 43' and spring 52 are in place, a cotter pin 57 is inserted through holes 56 and 56' to prevent weight 43' from coming off as the bicycle is operated.

As will be evident, when the rider starts the bicycle, the axle will turn slowly to carry arm 44' around which throws weight 43' outwardly. However, and before weight 43' can pivot arm 44' about pivot 42' to pull connecting rod 53 and thus operate pulley segment 29 via connector 59, that weight 43' must first overcome the tension of spring 52. This delays the motion of pulley segment 29 until the bicycle is well underway, thus maintaining the desired low gear ratio for easier acceleration.

What is claimed is:

1. A bicycle having a frame and front and rear wheels supported by said frame, said frame including a bifurcated truss for rotatably supporting an axle for said rear wheel, said axle being fixed to said rear wheel for rotation therewith, a pedal assembly intermediate said wheels, a one-way clutch on said pedal assembly, a pulley mounted on said rear wheel axle with said pulley being constituted by two laterally separated segments which are laterally moveable on said axle, belt or chain means interconnecting said pedal assembly with said pulley, an idler for maintaining tension on said belt or chain, the inner sides of said pulley segments being sloped and the outer side portions of said belt or chain mating with said sloping sides so that tension on said belt or chain will cause it to move inwardly on said pulley to increase the gear ratio, centrifugal means rotatable with said axle for increasing the spacing between said pulley segments with increasing bicycle speed to thereby increase the gear ratio spring means associated with said axle to bias said pulley segments together for decreasing the spacing between said pulley segments with decreasing bicycle speed to thereby decrease the gear ratio, and means for adjusting the tension on said spring means.

2. A bicycle as recited in claim 1 in which means are provided for each of said pulley segments, screw means for adjusting the tension on one of said spring means, and cable means for adjusting the tension on the other of said spring means.

3. A bicycle having a frame and front and rear wheels supported by said frame, said frame including a bifurcated truss for rotatably supporting an axle for said rear wheel, said axle being hollow with said rear wheel being fixed thereto for rotation therewith, a pedal assembly intermediate said wheels, a one-way clutch on said pedal assembly, a pulley mounted on said rear wheel axle with said pulley being constituted by two laterally separated segments which are laterally moveable on said axle, belt or chain means interconnecting said pedal assembly with said pulley, an idler for maintaining tension on said belt or chain, the inner sides of said pulley segments being sloped and the outer side portions of said belt or chain mating with said sloping sides so that tension on said belt or chain will cause it to move inwardly on said pulley to increase the gear ratio, said axle having opposed slots in the vicinity of said pulley segments, a bar connected to at least one of said pulley segments with said bar extending through said slots, centrifugal means rotatable with said axle for increasing the spacing between said pulley segments with increasing bicycle speed to thereby increase the gear ratio, spring means mounted within said axle and engaging said bar to bias said pulley segments together for decreasing the spacing between said pulley segments with decreasing bicycle speed to thereby decrease the gear ratio, and means for adjusting the tension on said spring means.

4. A bicycle as recited in claim 3 in which screw means are provided for adjusting the tension on said spring means.

5. A bicycle as recited in claim 3 in which spring means are provided for each of said pulley segments, screw means for adjusting the tension on one of said spring means, and cable means for adjusting the tension on the other of said spring means.

6. An axle for the rear wheel of a bicycle, said axle being hollow and carrying spoke supports at one side thereof for supporting a wheel for rotation therewith, pulley means mounted on the other side of said axle, said pulley means being constituted by two laterally separated segments which are laterally moveable on said axle and mounted for rotation with said axle, the inner sides of said pulley segments being sloped so that tension on a belt or chain which mates with said inner sides will cause said belt or chain to move inwardly on said pulley segments, a bar connected to at least one of said pulley segments with said bar extending through said slots, centrifugal means secured to said axle at said one side thereof for rotation with said axle for increasing the spacing between said pulley segments with increasing axle rotation rate, spring means mounted with said axle and engaging said bar to bias said pulley segments together for decreasing the spacing between said pulley segments with decreasing bicycle speed to thereby decrease the gear ratio, screw means for adjusting the tension on one of said pulley segments, and means operable by cable for adjusting the tension on the other of said pulley segments.

7. An axle as recited in claim 6 wherein said centrifugal means includes an arm having one end thereof pivotally mounted on said axle and approximately paralleling said axle when the bicycle is still, said arm having its free outer portion bent outwardly, a weight movably mounted on said outer portion, and spring means biasing said weight toward said axle to delay the operation of said centrifugal means.

8. A bicycle having a frame and front and rear wheels supported by said frame, said frame including a bifurcated truss for rotatably supporting an axle for said rear wheel, said axle being fixed to said rear wheel for rotation therewith, a pedal assembly intermediate said wheels, a one-way clutch on said pedal assembly, a pulley mounted on said rear wheel axle with said pulley being constituted by two laterally separated segments which are laterally moveable on said axle, belt or chain means interconnecting said pedal assembly with said pulley, an idler for maintaining tension on said belt or chain, the inner sides of said pulley segments being sloped and the outer side portions of said belt or chain mating with said sloping sides so that tension on said pulley to increase the gear ratio, centrifugal means rotatable with said axle for increasing the spacing between said pulley segments with increasing bicycle speed to thereby increase the gear ratio, and spring means, associated with said axle to bias said pulley segments together for decreasing the spacing between said pulley segments with decreasing bicycle speed to thereby decrease the gear ratio, said centrifugal means including an arm having one end thereof pivotally mounted on said axle and approximately paralleling said axle when the bicycle is still, said arm having its free outer portion bent outwardly, a weight movably mounted on said outer portion, and spring means biasing said weight toward said axle to delay the operation of said centrifugal means.

* * * * *